United States Patent
Jäger et al.

(10) Patent No.: US 11,162,410 B2
(45) Date of Patent: Nov. 2, 2021

(54) DIESEL ENGINE, MOTOR VEHICLE AND METHOD FOR REDUCING HEAT TRANSFER TO A PISTON OF A CYLINDER OF A DIESEL ENGINE

(71) Applicant: Scania CV AB, Södertälje (SE)

(72) Inventors: Anders Jäger, Södertälje (SE); Thomas Hällqvist, Rönninge (SE); Daniel Norling, Huddinge (SE)

(73) Assignee: SCANIA CV AB

(\*) Notice: Subject to any disclaimer, the term of this patent is extended or adjusted under 35 U.S.C. 154(b) by 0 days.

(21) Appl. No.: 17/056,786

(22) PCT Filed: May 29, 2019

(86) PCT No.: PCT/SE2019/050501
§ 371 (c)(1),
(2) Date: Nov. 19, 2020

(87) PCT Pub. No.: WO2019/231386
PCT Pub. Date: Dec. 5, 2019

(65) Prior Publication Data
US 2021/0180508 A1    Jun. 17, 2021

(30) Foreign Application Priority Data
May 30, 2018  (SE) .................................... 1850651-9

(51) Int. Cl.
*F02M 69/04*  (2006.01)
*F02B 23/06*  (2006.01)
(Continued)

(52) U.S. Cl.
CPC ............ *F02B 23/0645* (2013.01); *F02F 3/24* (2013.01); *F02F 3/26* (2013.01); *F02F 3/28* (2013.01); *F02M 61/1806* (2013.01)

(58) Field of Classification Search
CPC .............. F02B 23/0651; F02B 23/0672; F02B 23/0696
(Continued)

(56) References Cited

U.S. PATENT DOCUMENTS 8,505,513 B2    8/2013   Kashdan ..................... 123/270
9,284,877 B2 \*  3/2016   Yoo ..................... F02B 23/0684
(Continued)

FOREIGN PATENT DOCUMENTS

DE   10 2016 122 500 A1   6/2017
JP   H04-330328 A         11/1992
(Continued)

OTHER PUBLICATIONS

Novelty Search Report dated Oct. 5, 2017.
(Continued)

*Primary Examiner* — Long T Tran
*Assistant Examiner* — James J Kim
(74) *Attorney, Agent, or Firm* — Ostrolenk Faber LLP

(57) ABSTRACT

A diesel engine includes at least one cylinder (1) with a piston (2) having a piston bowl (3). A fuel injector (6) is configured to direct a fuel spray towards a target area (21) on an annular wall section (22) of the piston bowl so as to make a flame (20) formed by ignition of the fuel spray hit the target area. The target area borders, via a flow separation edge (23), on a lowered flow separation area (24) on the annular wall section so as to give this annular wall section a stepped configuration. The flow separation edge and flow separation area are configured to induce the formation of a vortex-filled wake between the flame and the flow separation area on the downstream side of the flow separation edge when the flame flows from the target area, across the flow separation edge and over the flow separation area.

10 Claims, 6 Drawing Sheets

(51) Int. Cl.
*F02F 3/24* (2006.01)
*F02F 3/26* (2006.01)
*F02F 3/28* (2006.01)
*F02M 61/18* (2006.01)

(58) Field of Classification Search
USPC ........................................................ 123/445
See application file for complete search history.

(56) References Cited

U.S. PATENT DOCUMENTS

| | | | |
|---|---|---|---|
| 10,731,600 B2* | 8/2020 | Cho ..................... | F02B 23/0696 |
| 2006/0090726 A1* | 5/2006 | Meffert ............... | F02B 23/0672 |
| | | | 123/279 |
| 2011/0259297 A1* | 10/2011 | Rothbauer .......... | F02B 23/0696 |
| | | | 123/276 |
| 2011/0271931 A1 | 11/2011 | Rothbauer et al. ........... | 123/279 |
| 2013/0019838 A1* | 1/2013 | Lee ..................... | F02B 23/0651 |
| | | | 123/298 |
| 2014/0048036 A1* | 2/2014 | Zoeller ............... | F02B 23/0624 |
| | | | 123/294 |
| 2014/0305402 A1* | 10/2014 | Zoeller ............... | F02B 23/0651 |
| | | | 123/294 |
| 2015/0053172 A1* | 2/2015 | Long ................... | F02B 23/0651 |
| | | | 123/298 |
| 2016/0138519 A1 | 5/2016 | Subatch, Jr. et al. | |
| 2016/0363042 A1* | 12/2016 | Long ................... | F02B 23/0669 |
| 2018/0142607 A1 | 5/2018 | Solomon et al. | |
| 2020/0149465 A1* | 5/2020 | Kurtz ................. | F02B 23/0669 |

FOREIGN PATENT DOCUMENTS

| | | |
|---|---|---|
| JP | 2004-190572 A | 7/2004 |
| JP | 2013-177844 A | 9/2013 |
| WO | WO 2014/094796 A1 | 6/2014 |

OTHER PUBLICATIONS

Office Action dated Dec. 5, 2018 in corresponding Swedish Patent Application No. 1850651-9.
International Search Report dated Aug. 2, 2019 in corresponding PCT International Application No. PCT/SE2019/050501.
Written Opinion dated Aug. 2, 2019 in corresponding PCT International Application No. PCT/SE2019/050501.
R.J. Tabaczynski et al., "Further Refinement and Validation of a Turbulent Flame Propagation Model for Spark-ignition Engines," Combustion and Flame, 39:111-121 (1980).

* cited by examiner

DIESEL ENGINE, MOTOR VEHICLE AND METHOD FOR REDUCING HEAT TRANSFER TO A PISTON OF A CYLINDER OF A DIESEL ENGINE

CROSS-REFERENCE TO RELATED APPLICATIONS

The present application is a 35 U.S.C. §§ 371 national phase conversion of PCT/SE2019/050501, filed May 29, 2019, the contents of which are incorporated herein by reference, which claims priority of Swedish Patent Application No. 1850651-9 filed May 30, 2018, the contents of which are incorporated by reference herein. The PCT International Application was published in the English language.

TECHNICAL FIELD OF THE INVENTION

The present invention relates to a diesel engine. The invention also relates to a motor vehicle comprising a diesel engine and to a method for reducing the heat transfer to the piston of a cylinder of a diesel engine.

The diesel engine of the present invention may be a two-stroke engine or four-stroke engine, and it may for instance be used in a vehicle or constitute a stationary engine to be used for instance in a pump or an electric generator.

BACKGROUND AND PRIOR ART

Compression-ignition engines in the form of diesel engines are commonly used in different types of motor vehicles, such as trucks, buses and cars, and in different types of vessels, such as submarines and ships. Compression-ignition engines in the form of diesel engines are also used in many industrial applications.

A diesel engine has a number of cylinders with a reciprocating piston provided in each cylinder. At an upper end of the piston, a piston bowl is provided. Together with an upper part of the cylinder and a cylinder head, the piston bowl forms a combustion chamber, into which fuel is injected and combusted. The piston bowl is designed to contribute to mixing of air and fuel and to create a flow pattern influencing combustion and emission formation within the combustion chamber.

In a diesel engine, the fuel is injected into the combustion chamber as a fuel spray during a power stroke of the piston. The fuel is ignited under the effect of the compression pressure and the compression heat in the combustion chamber shortly after injection. The hot flame formed by the ignition of the injected fuel impinges on the wall of the piston bowl and strongly contributes to the heat loss in the cylinder. The major part of the heat transfer in a cylinder of a diesel engine goes to the piston of the cylinder, and a reduction of the heat transfer to the piston is therefore of interest when it comes to the search for a solution to improve the engine efficiency.

It is previously known to reduce the heat transfer to the piston of a cylinder in a diesel engine by providing the wall of the piston bowl with a thermal insulation coating, for instance of ceramic material. Such a solution is for instance disclosed in U.S. Pat. No. 8,505,513 B2. However, the application of a thermal insulation coating to the wall of the piston bowl will increase the cost of the piston and there is also a risk that the coating or fragments thereof will come loose and cause damage to the cylinder.

SUMMARY OF THE INVENTION

The object of the present invention is to provide a new and favorable manner of reducing the heat transfer to the piston of a cylinder in a diesel engine.

This object is achieved by means of a diesel engine having the features defined herein.

In the diesel engine of the present invention, the fuel injector of an engine cylinder is configured to direct an injected fuel spray towards a target area on an annular wall section of the piston bowl so as to make a flame formed by ignition of the injected fuel impinge on the target area. Via a flow separation edge, the target area borders on a lowered flow separation area on the annular wall section so as to give this annular wall section a stepped configuration. The flow separation edge and the flow separation area are configured to induce the formation of a vortex-filled wake between the flame and the flow separation area on the downstream side of the flow separation edge when the flame flows from the target area, across the flow separation edge and over the flow separation area. The flow separation edge constitutes a sharp corner between the target area and the lowered flow separation area, wherein the vortex-filled wake is formed by gas that is forced to recirculate in the area behind the flow separation edge when gases of the flame pass the flow separation edge while being subjected to boundary layer separation. The bulk flow of the flame will pass above the vortex-filled wake and is consequently prevented by the recirculating gas in the wake from coming into contact with the wall of the piston bowl at the wall area covered by the wake, i.e. at the flow separation area. This will reduce the heat transfer from the flame to the piston in this part of the piston bowl and thereby cause a reduction of the overall heat transfer from the flame to the piston. Thus, the vortex-filled wake will form a thermal insulation between the flame and a part of the wall of the piston bowl.

According to an embodiment of the invention, the flow separation edge and the flow separation area are provided on the side of the target area facing the annular top surface. Hereby, the heat transfer to the piston from the portion of the flame flowing from the target area and upwards along the wall of the piston bowl is thereby reduced. A flow separation edge and a flow separation area are with advantage also provided on the annular wall section on an opposite side of the target area facing away from the annular top surface. The heat transfer to the piston from the portion of the flame flowing from the target area and downwards along the wall of the piston bowl is thereby reduced.

According to another embodiment of the invention, the piston bowl comprises a central bottom portion and a side wall surrounding the central bottom portion, the side wall comprising:

an annular upper side wall portion which extends downwards and radially inwards from the annular top surface, and an annular and concave lower side wall portion which defines a lowest level of the piston bowl and which extends from the central bottom portion toward the upper side wall portion, wherein the annular wall section is located between the upper side wall portion and the concave lower side wall portion.

In this case, an annular knee projecting towards the center axis of the piston is with advantage formed at a transition between the upper side wall portion and the concave lower side wall portion, wherein the target area and the flow separation edge or edges are provided on this knee. This configuration with an annular knee located between the upper side wall portion and the concave lower side wall portion makes it possible to direct the fluid spray such that the flame formed by the ignition of the fuel spray is split on the annular knee into an upwardly directed flame portion and a downwardly directed flame portion. This achieves an improved mixing between the flame and the surrounding gas in the piston bowl.

According to another embodiment of the invention, the central bottom portion has a highest point located on the center axis of the piston, from which highest point the central bottom portion slopes downward towards the concave lower side wall portion. This configuration increases the compression achieved in the combustion chamber during the compression stroke.

According to another embodiment of the invention, the part of the target area closest to the flow separation edge is rectilinear or at least essentially rectilinear, as seen in a section taken in a vertical plane including the center axis of the piston, wherein this rectilinear part of the target area extends essentially in parallel with an adjacent part of the side wall of the piston bowl downstream of the flow separation edge. The flame is thereby directed to flow essentially in parallel with the side wall when passing the flow separation edge, which is favorable with respect to the formation of the vortex-filled wake downstream of the flow separation edge.

The invention also relates to a motor vehicle comprising the proposed diesel engine. The motor vehicle may be a heavy motor vehicle such as a truck or a bus, but it may also be a passenger car or another type of motor vehicle.

The above-mentioned object is also achieved by means of a method for reducing the heat transfer to the piston of a cylinder of the proposed diesel engine, comprising the step of injecting a fluid spray into the combustion chamber during or after a compression stroke, and directing the fluid spray towards the target area so that the flame formed by ignition of the injected fuel impinges on the target area, and at least a portion of the flame flows from the target area, across the flow separation edge and over the flow separation area under the formation of a vortex-filled wake between the flame and the flow separation area on the downstream side of the flow separation edge, so that the vortex-filled wake obstructing heat transfer from hot gases of the flame to the piston.

Advantages of the method appear from the above description of the proposed diesel engine.

Further advantages as well as advantageous features of the present invention will appear from the detailed description following below.

BRIEF DESCRIPTION OF THE DRAWINGS

Embodiments of the invention will in the following be described with reference to the appended drawings, in which.

DETAILED DESCRIPTION OF EMBODIMENTS OF THE INVENTION

Figure 1:
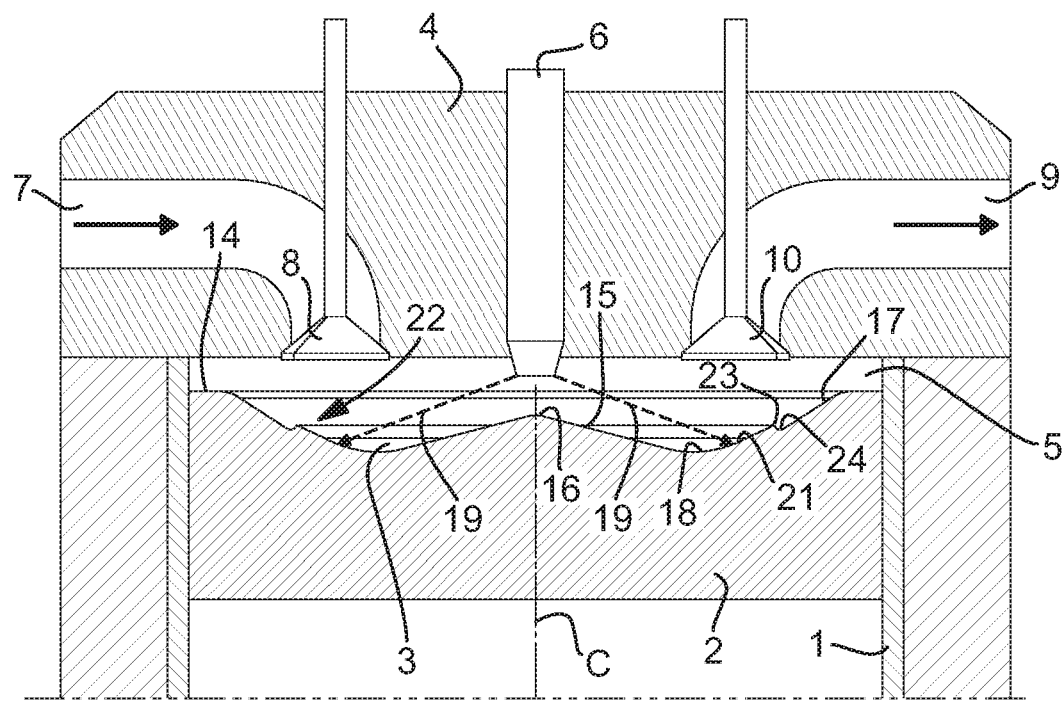
FIG. 1 is a schematic vertical section through a part of a cylinder of a diesel engine according to a first embodiment of the invention.
Figure 2:
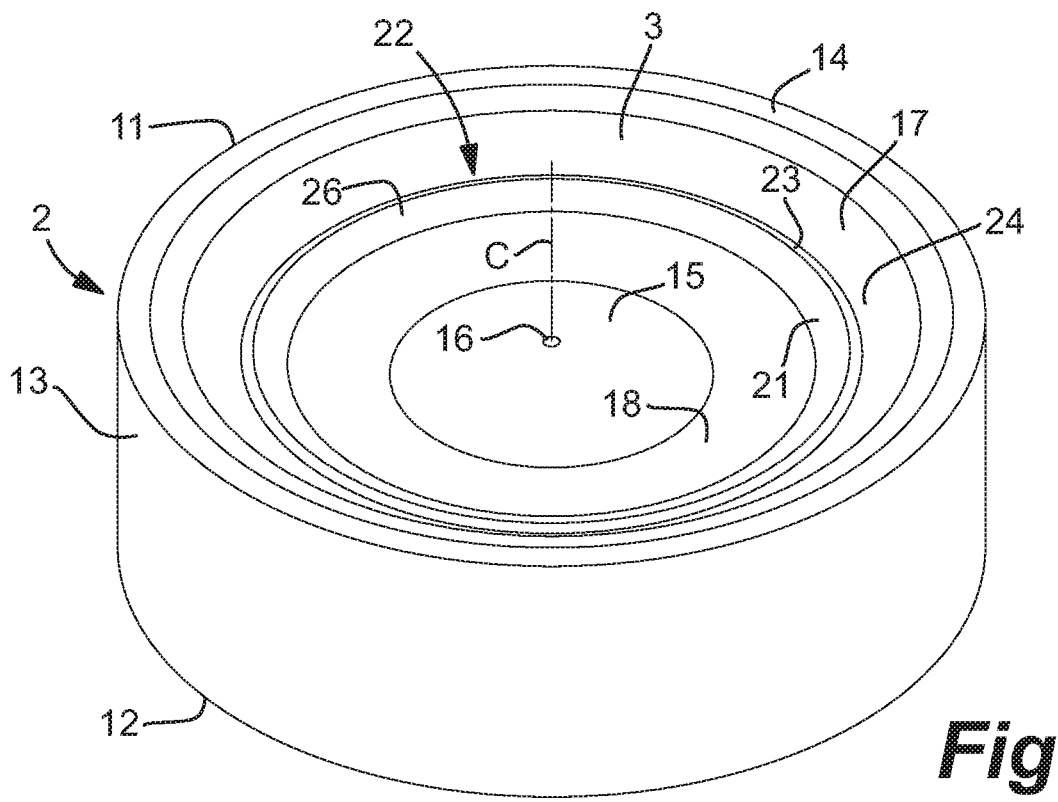
FIG. 2 is a perspective view of a piston provided in the cylinder of FIG. 1.
Figure 4:
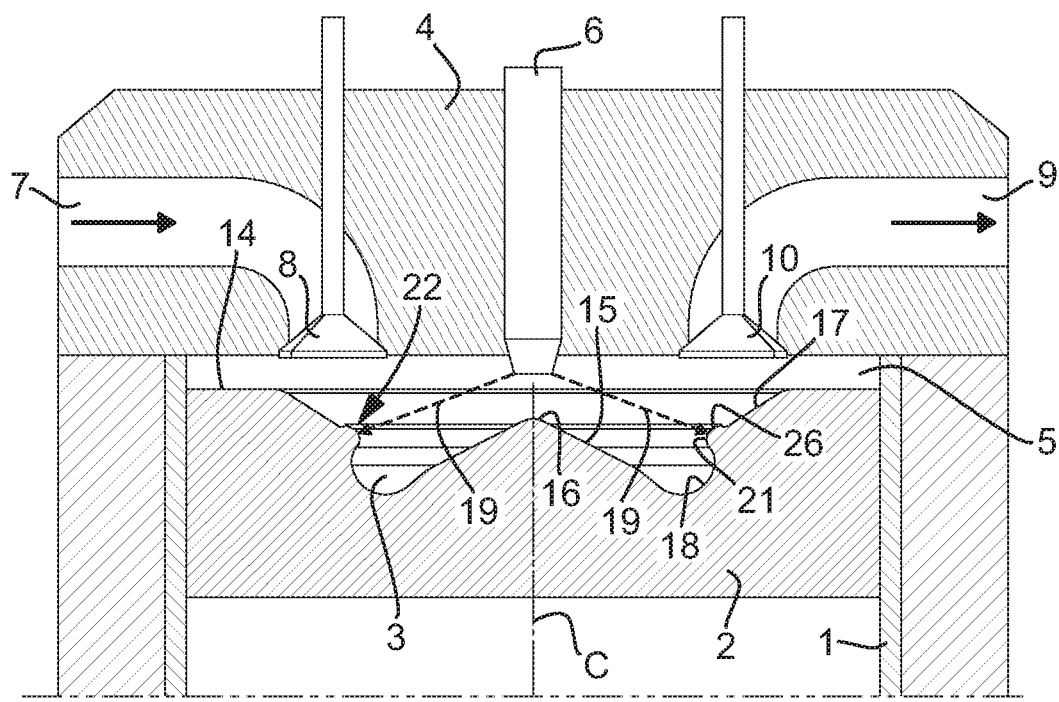
FIG. 4 is a schematic vertical section through a part of a cylinder of a diesel engine according to a second embodiment of the invention.
Figure 5:
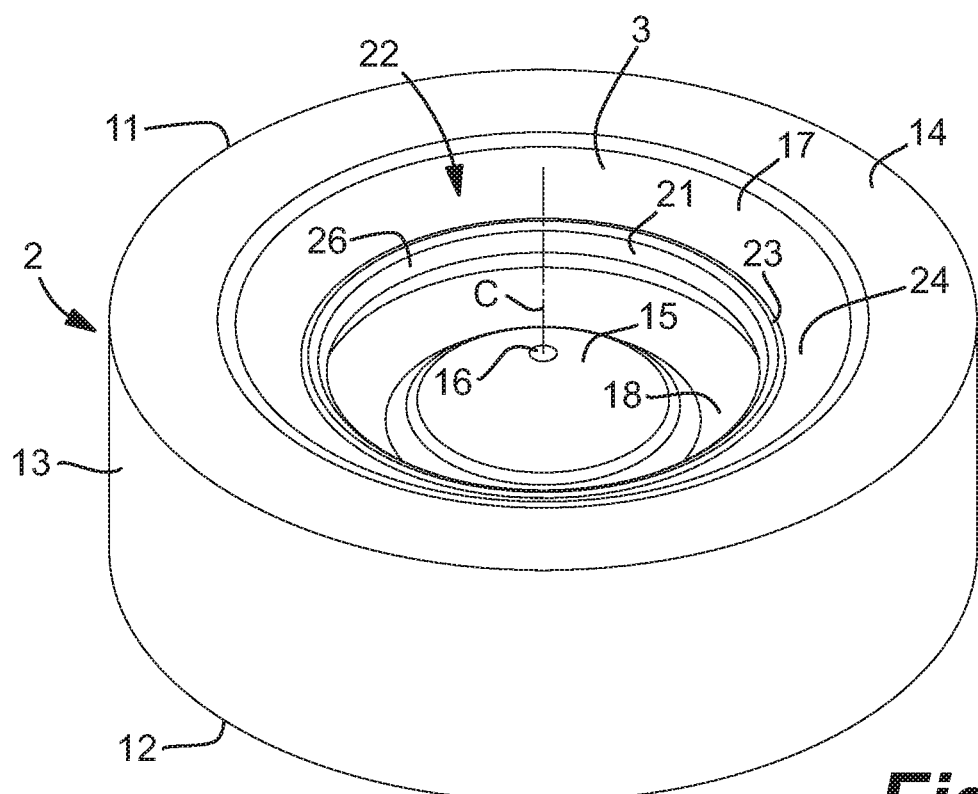
FIG. 5 is a perspective view of a piston provided in the cylinder of FIG. 4.
Figure 7:
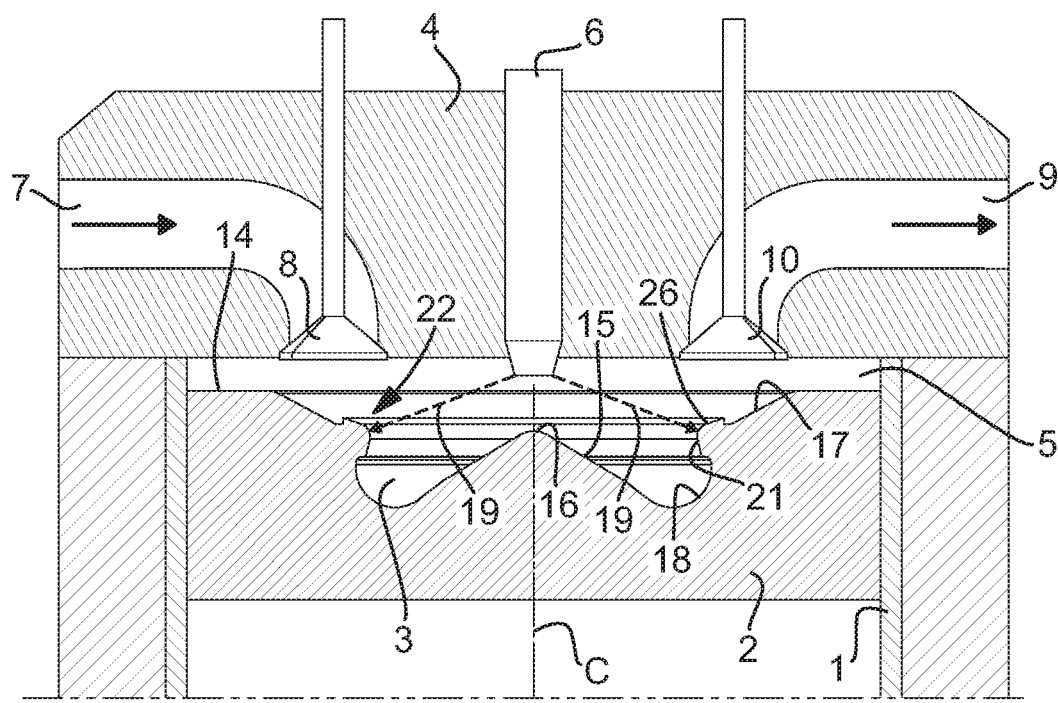
FIG. 7 is a schematic vertical section through a part of a cylinder of a diesel engine according to a third embodiment of the invention.

FIGS. 1, 4 and 7 show a vertical section taken along a center axis C of a cylinder 1 included in a diesel engine 30 according to different embodiments of the invention. In the cylinder 1, a piston 2 configured to reciprocate within the cylinder along the common center axis C is provided. A piston bowl 3 is formed in the piston 2. Together with internal walls of the cylinder 1 and an internal surface of a cylinder head 4, the piston bowl 3 forms a combustion chamber 5. A fuel injector 6 is mounted to the cylinder head 4 and positioned above the piston bowl 3 in alignment with the center axis C. Thus, the injector 6 is concentric with the piston bowl 3 and with the cylinder 1. An intake port 7 is provided in the cylinder head 4 for supply of air into the combustion chamber 5 via an intake valve 8. Furthermore, an exhaust port 9 is provided in the cylinder head 4 for evacuation of exhaust gases via an exhaust valve 10.

The piston 2 has an upper end 11 and a lower end 12, between which a center axis C and a peripheral envelope surface 13 extend. The envelope surface 13 has a circular cylindrical shape. An annular top surface 14 is provided at the upper end 11 of the piston. The piston bowl 3 is recessed with respect to an upper plane defined by the top surface 14 and it is surrounded by the annular top surface 14.

In the illustrated embodiments, the piston bowl 3 is rotationally symmetric about the center axis C.

In the illustrated embodiments, the piston bowl 3 comprises a central bottom portion 15 which slopes downwards from a central point located on the center axis C. The central bottom portion 15 is preferably cone-shaped or essentially cone-shaped with a rounded top 16. The top 16 of the central bottom portion 15 is located at a level below the upper plane defined by the top surface 14. The piston bowl 3 further comprises a side wall surrounding the central bottom portion 15. The side wall has an annular upper side wall portion 17 which extends downward and radially inward from the annular top surface 14. The side wall further has an annular and concave lower side wall portion 18 which defines a lowest level of the piston bowl 3. The lower side wall portion 18 extends from the central bottom portion 15 towards the upper side wall portion 17.

The fuel injector 6 is configured to inject fuel into the cylinder 1 as a fuel spray so that the fuel is mixed with air compressed in the cylinder 1 to form a fuel/air mixture. The fuel/air mixture is ignited by compression heat generated in the cylinder 1. The ignition takes place very rapidly after the injection of the fuel, before the fuel spray reaches the wall of the piston bowl 3. The ignited fuel of the fuel spray forms a flame 20. The fuel injector 6 includes a plurality of small injection orifices (not shown), formed at the lower end of a nozzle assembly of the fuel injector 6 for permitting the high pressure fuel to flow from a nozzle cavity of the fuel injector 6 into the combustion chamber 5 with high pressure in order to induce thorough mixing of the fuel with the hot compressed air within the combustion chamber 5. It should be understood that the fuel injector 6 may be any type of fuel injector capable of injecting high pressure fuel through a plurality of injection orifices into the combustion chamber 5.

Figure 3:
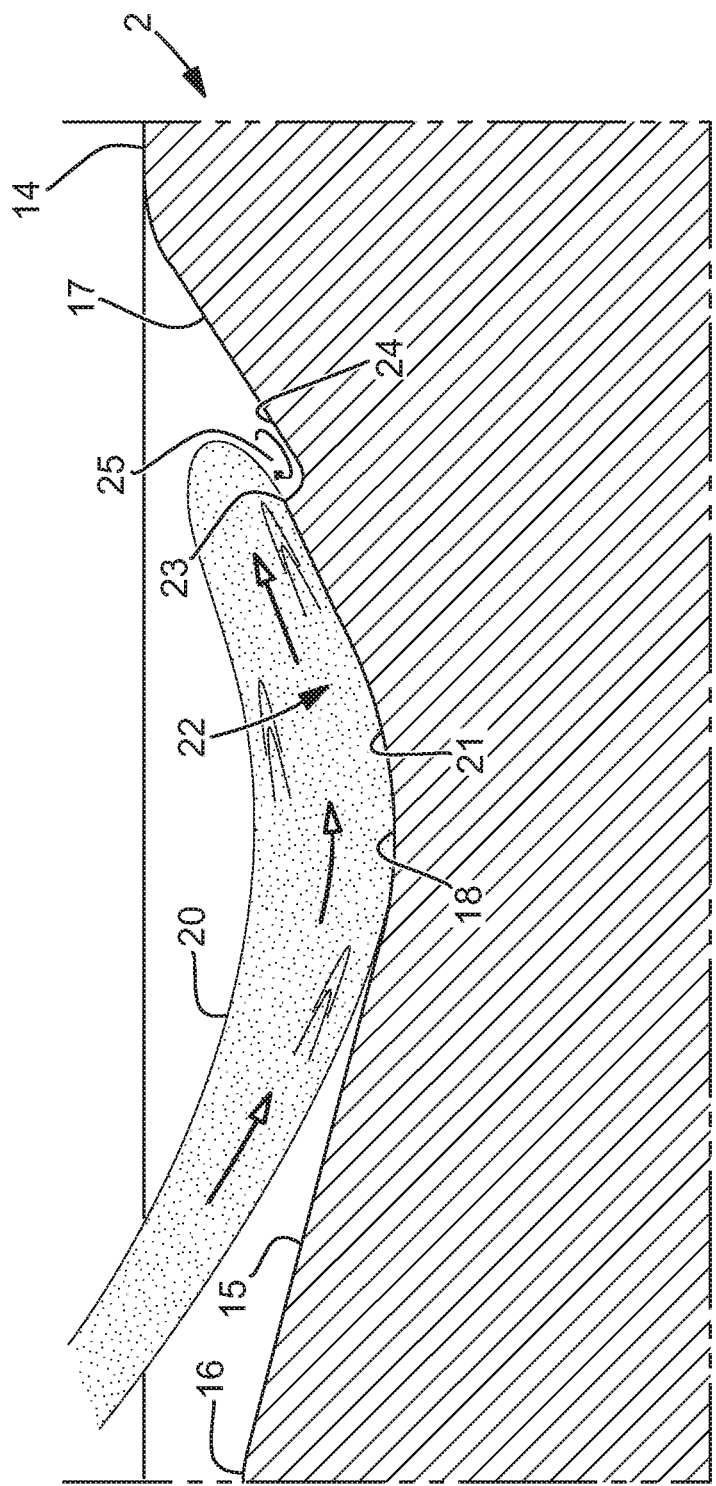
FIG. 3 is a schematic vertical section through a part of the piston of FIG. 2.
Figure 6:
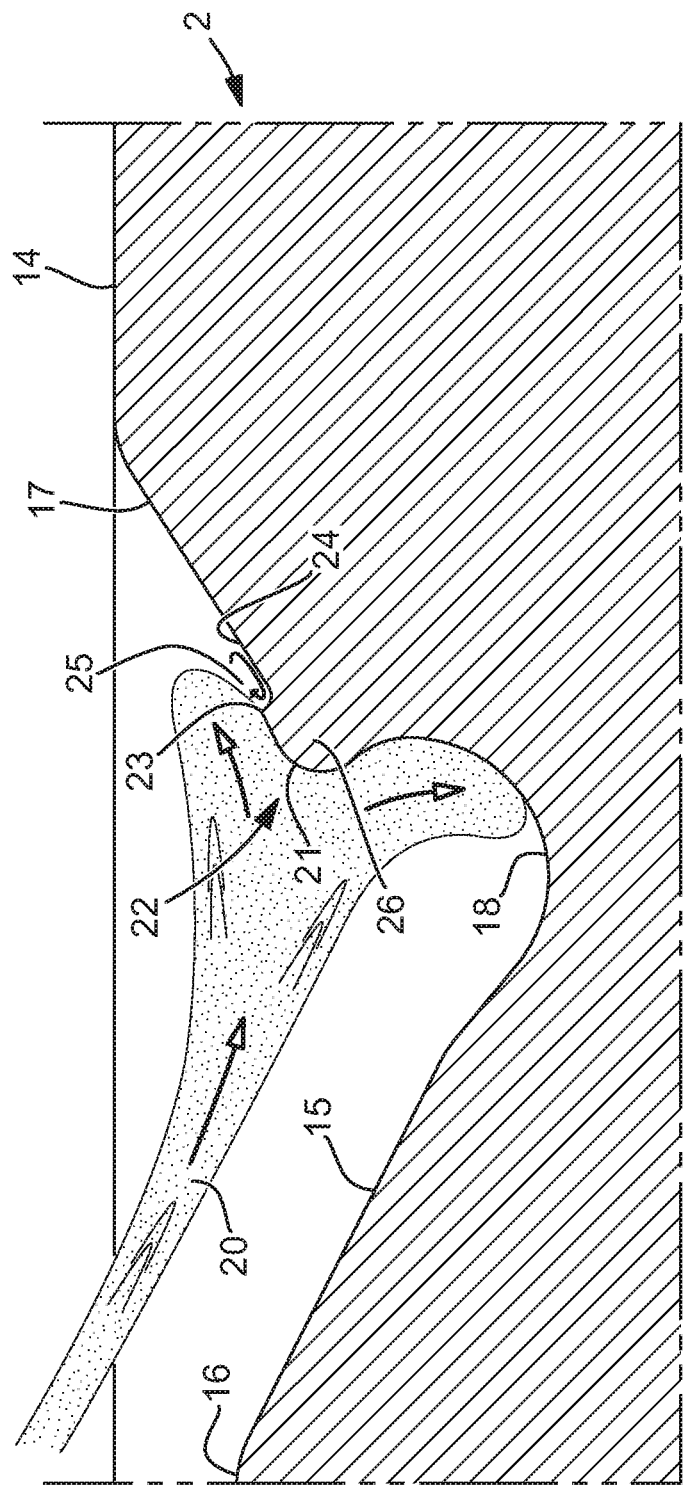
FIG. 6 is a schematic vertical section through a part of the piston of FIG. 5.

The injection orifices of the fuel injector 6 are so arranged that the fuel spray is injected in a direction (illustrated with arrows 19 in FIGS. 1, 4 and 7) towards a target area 21 on an annular wall section 22 of the piston bowl 3 so as to make the flame 20 formed by ignition of the injected fuel hit the target area 21. In the illustrated embodiments, the annular wall section 22 with the target area 21 is located between the above-mentioned upper side wall portion 17 and the above-mentioned concave lower side wall portion 18. An annular flow separation edge 23, 23*a* and an annular flow separation area 24, 24*a* are provided on the annular wall section 22 next to the target area 21 on the side of the target area facing the annular top surface 14, i.e. above the target area 21, wherein the target area 21 borders on the flow separation area 24, 24*a* via the flow separation edge 23, 23*a*. The flow separation area 24, 24*a* is lowered in relation to the target area 21, and the annular wall section 22 thereby has a stepped configuration. The flow separation edge 23, 23*a* and flow separation area 24, 24*a* are configured to induce the formation of a vortex-filled wake 25 (see FIGS. 3, 6 and 9) between the flame 20 and the flow separation area 24, 24*a* on the downstream side of the flow separation edge 23, 23*a* when the flame 20 flows from the target area 21, across the flow separation edge 23, 23*a* and over the flow separation area 24, 24*a*.

The flow separation edge 23, 23*a* forms a sharp corner at the transition between the target area 21 and the lowered flow separation area 24, 24*a*. Gases of the flame 20 are subjected to boundary layer separation when flowing over the flow separation edge 23, 23*a* and gas is forced, under the effect of the flame gases passing above the flow separation area 24, 24*a*, to recirculate in the area behind the flow separation edge 23, 23*a* under the formation of the above-mentioned vortex-filled wake 25. The wake 25 forms a thermal insulation between the bulk flow of the flame 20 and the wall of the piston bowl 3 at the flow separation area 24, 24*a*, which implies that the heat transfer from the flame 20 to the piston 2 is reduced by the wake 25.

In the embodiments illustrated in FIG. 4-9, an annular knee 26, which projects toward the center axis C of the piston 2, is formed at the transition between the upper side wall portion 17 and the concave lower side wall portion 18. The target area 21 and the flow separation edge 23, 23*a* are provided on this knee 26. When the flame 20 formed by the ignited fuel impinges on the target area 21 on the knee 26, the flame is split on the knee 26 into an upper flow portion flowing upwards towards the upper side wall portion 17 and a lower flow portion flowing downwards towards the lower side wall portion 18.

Figure 8:
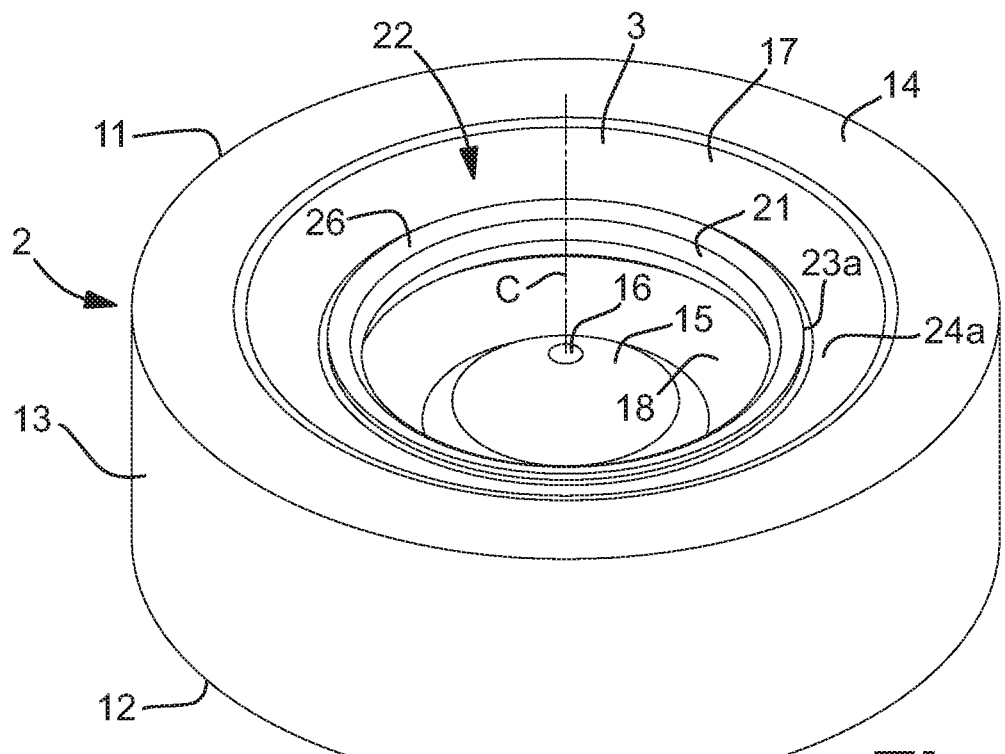
FIG. 8 is a perspective view of a piston provided in the cylinder of FIG. 7.
Figure 9:
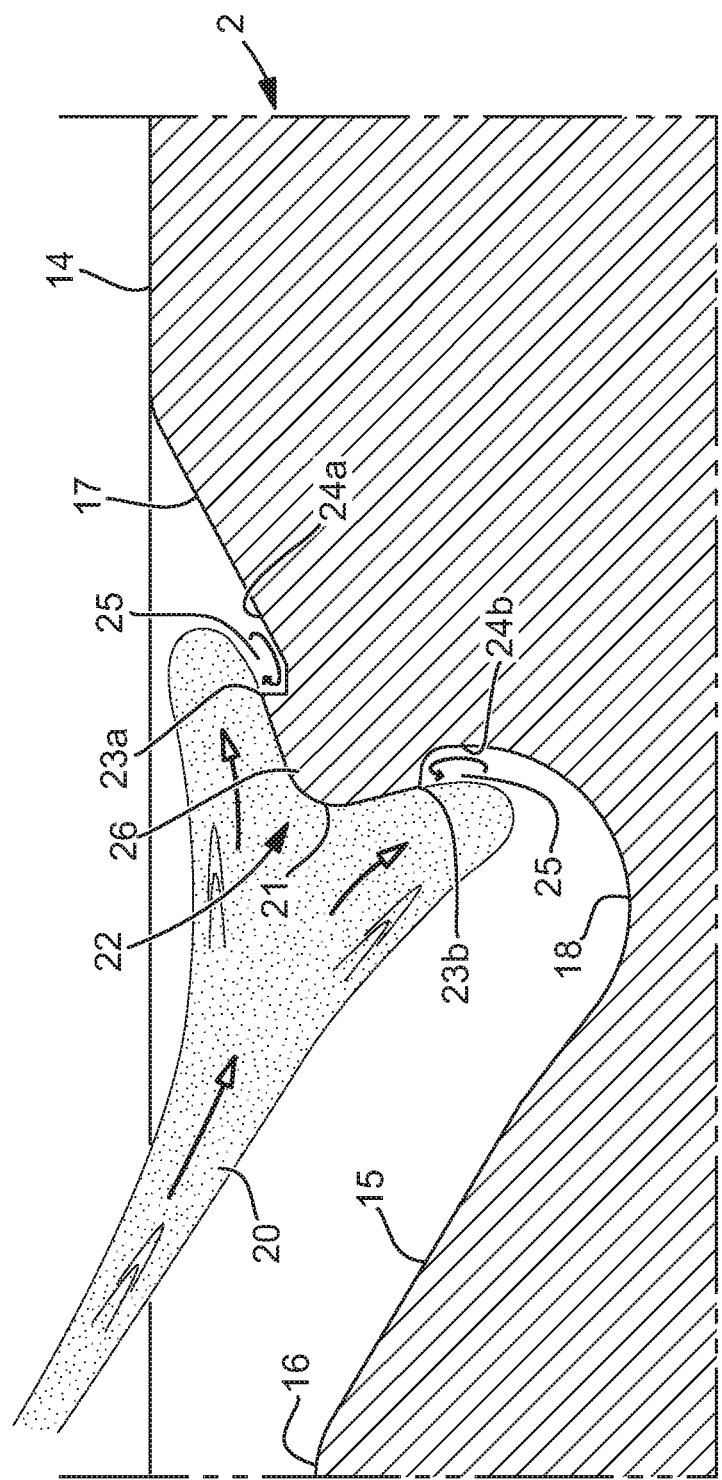
FIG. 9 is a schematic vertical section through a part of the piston of FIG. 8.

In the embodiment illustrated in FIG. 7-9, the above-mentioned flow separation edge 23*a* and flow separation area 24*a* located above the target area 21 constitute a first flow separation edge and a first flow separation area, respectively, of the piston bowl 3. In this case, a second flow separation edge 23*b* and a second flow separation area 24*b* are also provided on the annular wall section 22 on an opposite side of the target area 21 facing away from the annular top surface 14, i.e. below the target area 21. The second flow separation area 24*b* is lowered in relation to the target area 21, and the annular wall section 22 thereby has a stepped configuration as seen in a direction upwards from the target area 21 as well as in a direction downwards from the target area 21. The second flow separation edge 23*b* and second flow separation area 24*b* are configured to induce the formation of a vortex-filled wake 25 between the lower flow portion of the flame 20 and the second flow separation area 24*b* on the downstream side of the second flow separation edge 23*b* when the lower flow portion of the flame 20 flows from the target area 21, across the second flow separation edge 23*b* and over the second flow separation area 24*b*.

The second flow separation edge 23*b* is provided on the knee 26 and forms a sharp corner at the transition between the target area 21 and the lowered second flow separation area 24*b*. Gases of the lower flow portion of the flame 20 are subjected to boundary layer separation when flowing over the second flow separation edge 23*b* and gas is forced, under the effect of the flame gases passing above the second flow separation area 24*b*, to recirculate in the area behind the second flow separation edge 23*b* under the formation of the above-mentioned vortex-filled wake 25. The wake 25 forms a thermal insulation between the bulk flow of the lower flow portion of the flame 20 and the wall of the piston bowl 3 at the second flow separation area 24*b*, which implies that the heat transfer from the lower flow portion of the flame 20 to the piston 2 is reduced by the wake 25.

In the illustrated embodiments, the part of the target area 21 closest to each flow separation edge 23, 23*a*, 23*b* is rectilinear or at least essentially rectilinear, as seen in a section taken in a vertical plane including the center axis C, wherein this rectilinear part of the target area extends essentially in parallel with the adjacent part of the side wall of the piston bowl 3 downstream of the flow separation edge 23, 23*a*, 23*b*.

The diesel engine 30 is of course normally provided with several cylinders 1 with associated pistons 2.

In a method according to an embodiment of the present invention, carried out in the diesel engine 30 described with reference to FIG. 1, a flow of air is supplied into the combustion chamber 5 during an intake stroke of the piston 2 via the intake port 7 and the intake valve 8. During a subsequent compression stroke of the piston 2, a fuel spray is injected by the fuel injector 6 in a direction towards the target area 21. The fuel in the fuel spray is ignited under the effect of the compression pressure and the compression heat in the combustion chamber 5 shortly after injection into the combustion chamber 5. The injected fuel is thereafter subjected to diffusion controlled combustion in the combustion chamber 5. The hot flame 20 formed by the ignition of the injected fuel impinges on the wall of the piston bowl 3 at the target area 21 and at least a portion of the flame 20 flows from the target area 21, across the flow separation edge 23 and over the flow separation area 24 under the formation of a vortex-filled wake 25 between the flame 20 and the flow separation area 24 on the downstream side of the flow separation edge 23, wherein the vortex-filled wake 25 obstructs heat transfer from hot gases of the flame 20 to the piston 2 at the flow separation area 24.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A diesel engine combustion chamber and piston, comprising:
    at least one cylinder, the combustion chamber being located inside the cylinder;
    a piston in and delimiting the combustion chamber;

a fuel injector having an outlet located in the combustion chamber, the injector being configured for injecting a fuel spray into the combustion chamber;

the piston comprises an annular top surface and comprises a piston bowl at an upper end of the piston; the annular top surface surrounding the piston bowl and also being configured to form part of the combustion chamber;

the piston having an annular wall section and a target area on the annular wall section;

the fuel injector is configured to direct the injected fuel spray toward the target area to make a flame formed by ignition of the injected fuel impinged on the target area;

the annular wall section has a lowered flow separation area on the annular wall section; a flow separation edge borders on the lowered flow separation area on the annular wall section and defines a stepped configuration on the annular wall section; the flow separation edge and the flow separation area are respectively so configured to induce formation of a vortex-filled wake between the flame and the flow separation area on a downstream side of the flow separation edge when the flame flows from the target area, across the flow separation edge and then over the flow separation area.

2. The diesel engine according to claim 1, wherein the flow separation edge and the flow separation area are located on a side of the target area facing the annular top surface.

3. The diesel engine of claim 2, further comprising a second flow separation edge and a second flow separation area on the annular wall section on an opposite side of the target area and facing away from the annular top surface.

4. The diesel engine of claim 1, further comprising:
the piston bowl comprises a central bottom portion and a side wall surrounding the central bottom portion;
the side wall comprising:
an annular upper side wall portion which extends downward and radially inward from the annular top surface;
an annular and concave lower side wall portion which defines a lowest level of the piston bowl and which extends from the central portion toward the upper side wall portion;
where in the annular wall section is located between the upper side wall portion and the concave lower side wall portion.

5. A diesel, engine according to claim 4, further comprising:
an annular knee projecting toward the center axis of the piston and is formed at a transition between the upper side wall portion and the concave lower side wall portion, and
the target area and the flow separation edge are provided on the knee.

6. A diesel engine according to claim 4, further comprising:
the central bottom portion has a highest point located on the center axis of the piston and the central bottom portion slopes downward toward the concave lower side wall portion from the highest point.

7. A diesel engine according to claim 1, further comprising:
the part of the target area closest to the flow separation edge is rectilinear, in a section taken in a vertical plane which includes the center axis of the piston, and the rectilinear part of the target area extends parallel to an adjacent part of the side wall of the piston bowl downstream of the flow separation edge.

8. A motor vehicle comprising a diesel engine according to claim 1.

9. A motor vehicle according to claim 8, wherein the motor vehicle is a heavy motor vehicle, a truck or a bus.

10. A method for reducing heat transfer to the piston of a cylinder of a diesel engine, wherein the engine is according to claim 1, the method comprises:
a step of injecting fluid spray into the combustion chamber during or after a compression stroke of the piston, directing the fluid spray toward the target area so that the flame formed by ignition of the injected fuel impinges on the target area and at least a portion of the flame flows from the target area, across the flow separation edge and over the flow separation area while under the formation of a vortex-filled wake between the flame and the flow separation area on the downstream side of the flow separation edge, such that the vortex-filled wake obstructs the heat transfer from hot gases of the flame to the piston.

* * * * *